H. F. WEISS.

METHOD AND APPARATUS FOR TRANSFORMING WOOD.

APPLICATION FILED NOV. 16, 1921.

Reissued Mar. 21, 1922.

2 SHEETS—SHEET 1.

15,316.

Inventor
Howard F. Weiss

By his Attorneys
Pennie Davis Marvin & Edmonds

H. F. WEISS.
METHOD AND APPARATUS FOR TRANSFORMING WOOD.
APPLICATION FILED NOV. 16, 1921.
Reissued Mar. 21, 1922.
2 SHEETS—SHEET 2.
15,316.
Fig. 3,
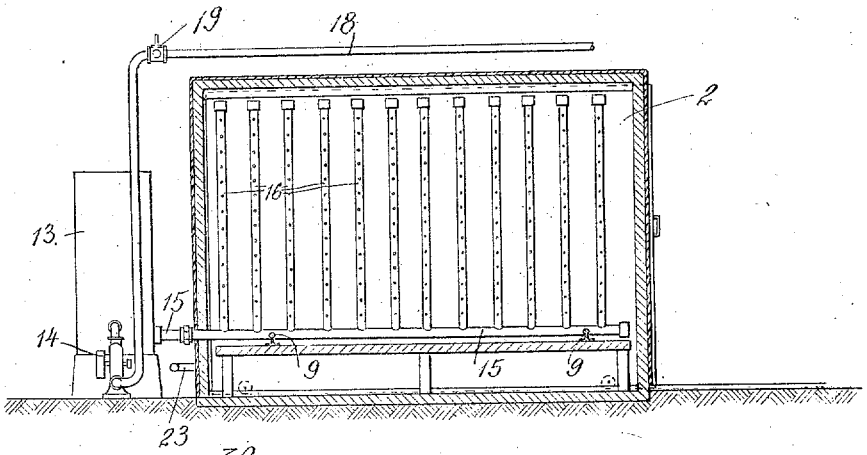
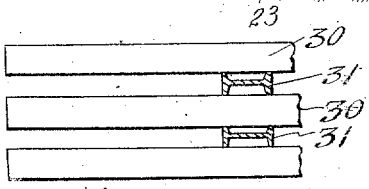
Fig. 4.
Fig. 5.
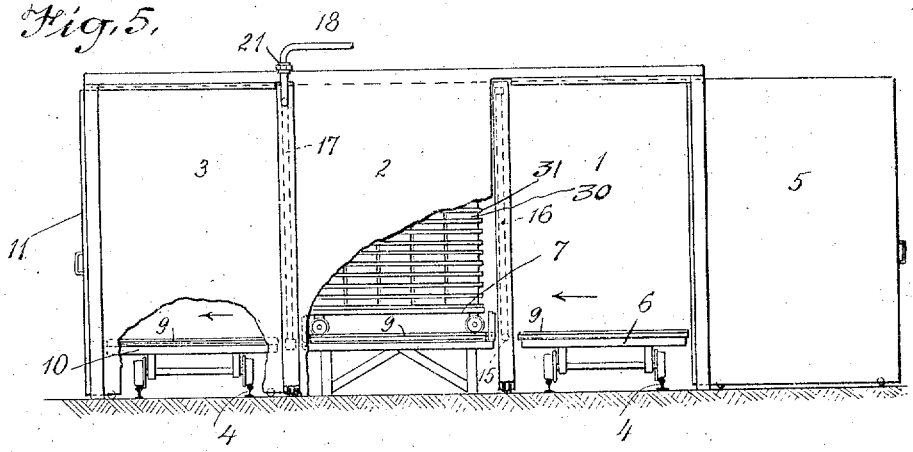
Inventor
Howard F. Weiss
By his Attorneys
Dennis Davis Marvin & Edmonds

UNITED STATES PATENT OFFICE.

HOWARD F. WEISS, OF MADISON, WISCONSIN, ASSIGNOR TO C. F. BURGESS LABORATORIES, OF MADISON, WISCONSIN, A CORPORATION OF WISCONSIN.

METHOD AND APPARATUS FOR TRANSFORMNG WOOD.

15,316. Specification of Reissued Letters Patent. Reissued Mar. 21, 1922.

Original No. 1,366,225, dated January 18, 1921, Serial No. 195,012, filed October 6, 1917. Application for reissue filed November 16, 1921. Serial No. 515,560½.

*To all whom it may concern:*

Be it known that I, HOWARD F. WEISS, a citizen of the United States, residing at Madison, in the county of Dane, State of Wisconsin, have invented certain new and useful Improvements in Methods and Apparatus for Transforming Wood; and I do hereby declare the following to be a full, clear, and exact description of the invention, such as will enable others skilled in the art to which it appertains to make and use the same.

This invention relates to the transforming or coloring or fuming of wood, and to the production of a novel product in the form of the transformed or colored or fumed wood; and the invention includes the new product as well as the method and apparatus for its production.

The invention is based upon the discovery that wood can be uniformly or homogeneously transformed or colored and thereby converted into a darkened product of rich color by subjecting the wood to the proper temperature for the required period of time and by maintaining uniform conditions during the treatment.

According to the present invention, the wood is heated to a temperature of about 380° F. to 420° F. for producing the best results, and is maintained at such temperature and uniformly subjected to the heat treatment for the proper length of time, for example, two or three hours, until the desired conversion or transformation or coloring has been effected: and the heat treatment is uniformly applied to substantially the entire surface of the wood during this period.

While the drying of the wood to be transformed or colored may be effected during or as an incident of the heat treatment, yet I have found it to be more advantageous to use dried wood, preferably kiln dried, before it is subjected to temperatures of over 300° F.; otherwise the wood is liable to warp, split, check, etc.

In carrying out the process of the present invention, I have found it essential to maintain a temperature of over 300° F. in order to obtain the desired transformation; and I have obtained best results with temperatures ranging between about 380° F. and 420° F., inasmuch as it is more difficult to produce the dark, warm tones of color desirable at temperatures below 380° F. unless the wood is held at such temperatures for an impracticable length of time. On the other hand, temperatures above 420° F. tend to char and destroy the wood, and to give an unsatisfactory product.

In the carrying out of the process of the invention, it is essential not only to maintain the proper temperatures during the transformation, but likewise to apply the heat treatment uniformly—i. e. so that substantially every part of the surface thereof is subjected to the same temperature—in order that the wood may be evenly colored or transformed; inasmuch as heating to the temperatures above referred to, without uniform application of heat, will prevent the uniformity of treatment which is desired. If thus the wood is heated in a closed cylinder or container provided with a heating jacket, such as a steam jacket, and the closed retort or container is heated to a temperature of for example 400° F., it has been found that the product obtained was unsatisfactory and not a commercial product, the distribution of the heat not being uniform and the wood near the heating surfaces being very darkly colored and even charred, while the wood in the interior of the retort or receptacle was relatively little colored or affected; and even where coloring took place, the results obtained were not uniform.

Accordingly, in the carrying out of the process of the present invention, the heat treatment is uniformly applied so that unevenly transformed and unsatisfactory products will be avoided.

I have found it particularly advantageous to carry out the transformation with heated air by bringing the heated air into contact with the wood to be transformed and by regulating the temperature of the air so that it will uniformly or homogeneously transform the wood with which it is brought in contact.

Inasmuch as the wood to be transformed requires a support during this treatment, and inasmuch as a stationary support which would cover any considerable part of the wood would cause unevenness in the coloring or transforming, I have found it of importance to so support the wood that it will be uniformly treated even at the places of support. Thus the ordinary wood stickers which are commonly used in stacking the lumber will leave a lighter streak upon the lumber with which they are in contact. In order to avoid such streaking of the wood, I provide for the movement of the stickers during the treatment so that no one place will be unevenly colored; or I provide movable supports which will support the wood at different places progressively during the treatment; or I provide stickers which may remain stationary but which are of an open-work construction (such as I-beams) so that the heated air may circulate freely around the wood and around the stickers. Where the stickers are in the form of I-beams with edges which are not more than one-eighth of an inch thick, the air can pass readily through them between the edges. These stickers can, of course, be moved to further minimize any danger of uneven coloration. With stickers which have a wider bearing surface on the wood, their movement into contact with other surfaces of the wood can be effected in any suitable manner. When the wood is supported in the form of a single layer upon movable supports or conveyers such as chains, the lumber may be carried along slowly by the chain or chains, or upon small skids secured thereto, set at a slight bevel or slant, so that the lumber will be supported at different places along its surface during its transfer. Usually there will be sufficient movement of the lumber itself without the provision of special means for effecting this movement. In such a case it will be evident that the treatment should be sufficiently prolonged by the provision of suitable apparatus or by repetition of the treatment until the desired transformation has taken place.

I have found it of value to carry out the process of the present invention in three stages, during the first of which the lumber is preheated, during the second of which it is maintained at the transformation temperature for the required period of time, and during the third of which it is cooled by the circulation of air in contact therewith; the heated air resulting from the cooling of the lumber being used to preheat the fresh lumber in the first stage of the process.

It will be evident that various types and constructions of apparatus are available for the carrying out of the process of the present invention; and that, when the process is to be carried out in the three stages above referred to, various types and constructions of apparatus will likewise be available for this three-step process. I have found the apparatus illustrated, more or less conventionally and diagrammatically, in the accompanying drawings, to be well adapted to the practice of the invention; and the invention will be further described in connection therewith, but it will be understood that the more specific description and illustration are intended as illustrative of the invention and not as limiting its intent and scope. In the accompanying drawings, Figure 1 is a plan view of an apparatus embodying the invention and adapted for the practice of the process of the invention and the production of the novel product of the invention;

Fig. 3 is a longitudinal section taken on line 3—3 of Fig. 1;

Fig. 4 is a front elevation, with parts broken away, further illustrating the construction of the apparatus; and Fig. 5 is a vertical sectional view, enlarged, taken on line 5—5 of Fig. 2, and illustrates the manner of stacking the lumber on the I-beam stickers.

Figure 1:
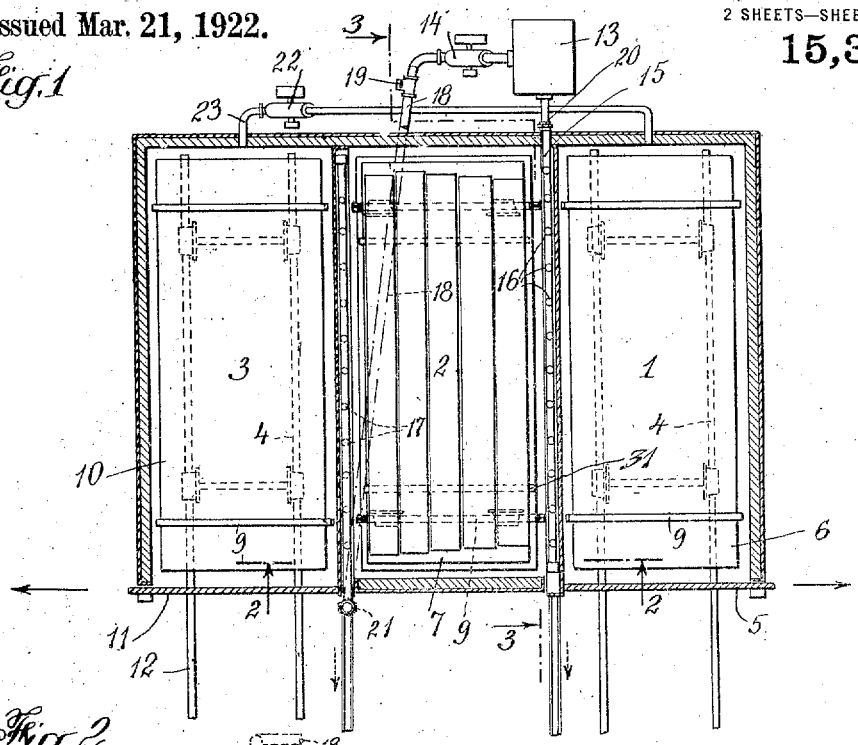
Figure 2:
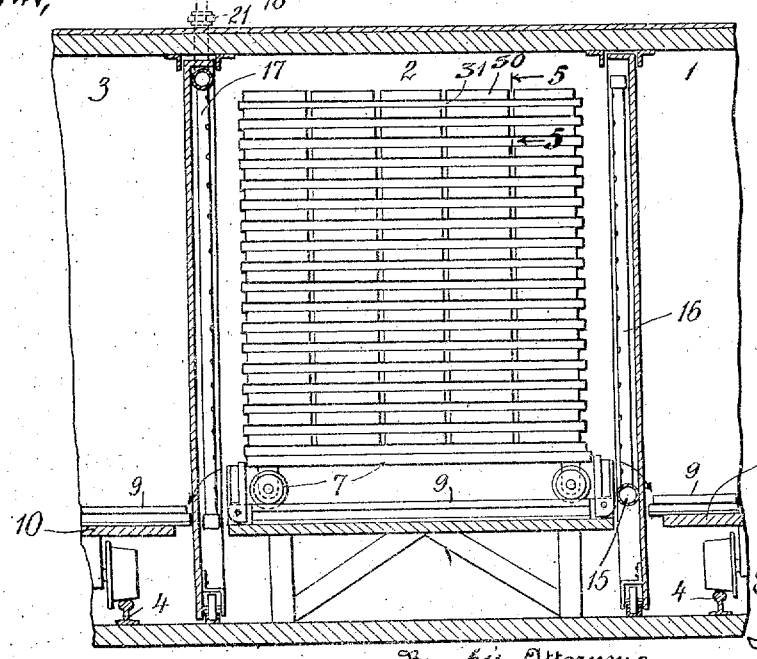
Fig. 2 is a vertical sectional view of the central or transforming chamber of Fig. 1 taken on line 2—2 of Fig. 1.

The apparatus illustrated is made up of three chambers, 1, 2 and 3 in which the heating and transformation is to be carried out, these chambers being provided with suitable walls for retaining the heat therein. The chamber 1 is the preheating chamber in which the preheating of the lumber takes place, and this chamber is provided with suitable tracks 4 by means of which the lumber is introduced. As illustrated in Fig. 4, the lumber is placed upon a truck 7 which is in turn carried by a transfer table 6 which is run into the preheating chamber 1 through the side of the preheating chamber on the tracks 4. A door 5 is provided for the admission and removal of the transfer table.

Between the preheating chamber 1 and the transforming chamber 2, and also between the transforming chamber 2 and the cooling chamber 3 are arranged doors which open to permit the truck 7 to pass from one to another of these chambers, the truck passing from the transfer table 6 to the track 9 and thence to another transfer table 10 in the cooling chamber, the truck being removed from this transfer table through another door 11 in the front thereof on tracks 12. The transfer of the truck from one chamber to another and the introduction and removal of the transfer table can be effected by any suitable means (not shown).

In order to heat the apparatus, there is provided a retort or boiler 13 which may be heated by gas, coal, wood or other means. The air thus heated is forced by the blower 14 into a large feed pipe 15 to which a series of feed pipes 16 are attached. These feed pipes 16 are vertically arranged and extend the entire height of the apparatus, as well as along one side of the transforming chamber, and they are provided with small holes of proper size and suitably spaced apart to enable the desired uniform distribution of the air therethrough to be obtained.

A similar series of pipes is provided at 17 on the other side of the transforming chamber, and these pipes are connected with the suction side of the blower 14 by means of a connecting pipe 18 so that they function as suction pipes for withdrawing the air from the transforming chamber after it has been introducted through the pipes 16 and passed over the surfaces of the pieces of lumber 30 supported on the stickers 31 within the transforming chamber. The air is thus circulated from the heater through the pipes 16 into the transforming chamber and the hot air is distributed throughout the chamber and passes between the layers of boards piled horizontally on the truck 7, after which the air is sucked out through the pipes 17 and through return pipe 18 to the blower and heater. By the provision of proper regulating means for regulating the temperature of the air and of thermostats or thermometers for observing the temperature within the transforming chamber, the desired uniformity of temperature and of distribution of the hot air within this chamber and through and around the lumber can be obtained. A thermostat (not shown) may thus be provided connected with the damper 19 so that, if the temperature of the air in the transforming chamber rises above that which is desired, cool air may be admitted into the circuit through the damper 19. The main temperature control may be obtained by properly regulating the heater 13.

The series of pipes 15, 16 and the series of pipes 17, are carried by the doors between the various chambers and are removed therewith to permit the passage of the trucks from one chamber to another. In the construction, illustrated, the feed and suction pipes 15 and 17 are so connected by detachable couplings 20 and 21 that they may be readily connected and disconnected, when this is desired.

In place of the series of perforated pipes 16 and 17, there can advantageously be used two perforated plates of iron or other suitable material. Such a construction will tend to reduce friction losses. The plates will be fastened in such a manner as to form two pockets, in one of which the air enters from the feeder 20 and in the other it is sucked through the exhaust duct 18.

It will be evident that the particular heating means utilized is capable of variation, and that it is of relatively little importance whether the air is directly heated and used in the form of heated products of combustion of the proper temperature, or whether the air is indirectly heated in any suitable manner so long as it is maintained at the proper temperature and with the necessary uniformity of distribution during the transforming operation.

With the apparatus above described, the highly heated lumber from the transforming chamber will pass to the cooling chamber, where the heat therefrom is utilized to heat air, with accompanying cooling of the lumber itself, and the heated air is then circulated by means of a blower 22 through a suitable connecting passage 23 to the preheating chamber 1, where it is utilized to preheat the fresh lumber therein, the distribution of the hot air being effected in any suitable manner (not shown). By proper distribution of the cooling air in the cooling chamber and of the preheating air in the preheating chamber, the lumber can be uniformly preheated before entering the transforming chamber and uniformly cooled before passing from the cooling chamber. The lumber may thus be cooled to 100°F. or less in the cooling chamber after which it can be handled like ordinary lumber.

As above pointed out, the wood to be transformed, if the best results are to be obtained, should be wood which is dried, and preferably kiln dried wood, before it is subjected to the temperatures utilized in the practice of the present invention.

Where the lumber is passed through the transforming apparatus on a truck, and the air is circulated through the lumber in the manner above described, I have found it advantageous to pile the lumber on the trucks and to separate the horizontal layers of the lumber or boards, indicated by 30 in the drawing, by means of stickers made of one inch I-beams, indicated by 31 in the drawing, these stickers being placed so that the web of the beam is horizontal. These I-beams may be spaced apart about three feet, although the number used and their arrangement will vary with the kind of wood to be treated. Certain woods tend to curl and twist more than others, and such woods will generally require more stickers than wood which tends to remain flat. Such one inch I-beams have their contacting edges of a thickness of only about one-eighth of an inch and these edges are spaced apart so that the hot air can circulate between the webs of the I-beams and the lumber. Any objectionable unevenness in coloration or transformation will thus be overcome wholly or in part.

In the carrying out of the process of the invention in the apparatus above described, with the wood stacked on the truck or car in the manner referred to, the wood will be preheated in the preheating chamber by the circulation of the air from the cooling chamber in contact therewith, and the lumber thus preheated will then be passed to the transforming chamber where it will be heated to a temperature of 380° F. to 420° F. for a suitable period of time, usually about two to three hours, the heat being uniformly applied and the lumber being uniformly transformed or colored by the proper circulation and uniformity of distribution of the heated air in contact therewith. When the lumber has been transformed or colored to the required degree, it is then passed into the cooling chamber where it is cooled by the circulation of a cool air in the cooling and preheating chamber after which it is transferred to its place of storage or of further treatment or use. The carrying out of the process in this way will involve a material conservation of heat because of the recovery of heat from the transformed lumber and the utilization thereof for preheating the fresh lumber. The transformation can be carried out, although with less economy of heat by omitting the preheating stage of the treatment and by allowing the transformed lumber to cool without recovery of heat therefrom, by introducing the lumber directly into the transforming chamber, but this will require a correspondingly increased period of time for the transformation because the lumber must first be brought to a temperature of about 380° F. and then held there for the necessary period of time, or example, two or three hours.

When the apparatus above described is in operation, it will be evident that the preheating and cooling operations may be carried out at the same time that the transformation is taking place, so that when one truck is ready to go to the cooling chamber, another truck will be ready to go from the preheating chamber to the transforming chamber. This transfer of trucks will be effective by suitable mechanism and the doors between the chambers will be opened for the transfer.

The results obtained by the heat treatment and transformation process of the present invention will give somewhat different results with different kinds of wood, but the general effect will be to darken the wood and give to it a rich brown coloration varying somewhat in depth of color with the wood treated, with the particular temperature used in the treatment, and with the duration of the treatment. It will thus be evident that the transformation may be carried to an extent which will give somewhat different shades by the proper selection of the lumber and by varying somewhat the period and the particular temperature of the transformation.

The transformed or cooled wood produced according to the present invention will accordingly be characterized by the changes which take place during the transformation and which result in the conversion of the lighter wood into a superior darkened product. Thus, in the case of oak, the transformation process of the present invention changes the oak from its natural light color to a rich brown, somewhat similar to the so-called fumed oak or light mission oak. The transformation, moreover, takes place with a change in the wood itself such that the entire wood structure is given the rich brown color. The transformed or colored wood is thus colored with such uniformity and to such a pleasing shade that it becomes immediately, without further treatment, a commercial product which is available for use wherever a superior darkened or colored wood is desired.

The product of the present invention is moreover one which is substantially free from streaks or inequalities in the coloring or transformation, so that it is available for use where a product of standard and uniform qualities is required. The product is thus distinguished from lumber which is streaked because of improper piling, or which is unevenly colored or transformed so that different pieces of lumber differ in their appearance.

The product of the present invention is, moreover, a product in which the wood has been changed or decomposed, although not in an objectionable sense, with the result that the wood retains its characteristic hardness but becomes less elastic in character. This reduction in elasticity is unobjectionable, and may even be advantageous, for many purposes, for which the lumber is used, where elasticity is not of particular importance, e. g., for flooring, trimming, etc.

The product of the present invention is furthermore one characterized by materially reduced hygroscopic properties so that its shrinkage and swelling qualities are very materially reduced. This reduction in the hygroscopic properties of the wood and reduction in the tendency to shrink and swell is of particular importance for many purposes, since the product may require little or no additional protection (e. g., by painting, etc.,) to prevent objectionable swelling and shrinking thereof. This advantage, moreover, is independent of or in addition to the advantage of coloration of the wood; although these advantages are accumulative when the desired coloration is also obtained. Thus, quite aside from any advantage of coloring which may be obtained, the product of the present invention has been found to shrink and swell about 50% less than the natural wood when exposed to the humidity changes of the air. The product can thus be used for high grade carpentry work where freedom from checks, cracks and swelling is greatly desired.

The process of the present invention, as will be readily understood, is moreover of a relatively simple and inexpensive nature, but it nevertheless gives a product of materially increased value and of improved quantities and characteristics, as above pointed out.

What I claim is:—

1. The method of homogeneously transforming and coloring wood which comprises subjecting the wood to a temperature of about 380° F. to 420° F. in a gaseous atmosphere and maintaining all parts of the wood at such temperature for a sufficient period of time to transform the wood into a homogeneously colored or darkened product with reduction of its hygroscopic properties, substantially as described.

2. The method of homogeneously transforming and coloring wood which comprises subjecting the wood to a temperature of about 380° F. to 420° F. by circulating a current of heated air in contact with substantially the entire surface of the wood, and continuing the treatment of the wood by this means for a sufficient period of time to transform the wood into a homogeneously colored or darkened product.

3. The method of homogeneously transforming and coloring wood which comprises preheating the wood, subjecting the preheated wood to a temperature of about 380° F. to 420° F. by circulating heated air in contact with substantially the entire surface of the wood, continuing the treatment at the specified temperature until the wood is transformed into a homogeneously darkened or colored product, cooling the transformed wood by circulation of air in contact therewith, and circulating the heated air resulting from the cooling of the wood into contact with the lumber before transformation in order to preheat the same.

4. The method of homogeneously transforming and coloring wood which comprises drying the wood at a temperature of about 150° F., subjecting the dried wood to a temperature of about 380° F. to 420° F. in a gaseous atmosphere, and maintaining all parts of the wood at such temperature until the wood has been transformed into a homogeneously darkened or colored product.

5. The method of homogeneously transforming and coloring wood which comprises subjecting the wood to a dry heat of about 380° F. to 420° F. for a period of about two to three hours, maintaining all parts of the wood at such temperature during such period, whereby the wood is transformed into a homogeneously darkened or colored product, substantially as described.

6. The method of homogeneously transforming and coloring wood which comprises preheating the wood to a temperature of about 150° F. by circulation of heated air into contact therewith, subjecting the preheated wood to a temperature of about 380° F. to 420° F. by circulation of heated air into contact therewith and by maintaining substantially all parts of the wood at this temperature until the wood has been transformed into a uniformly darkened or colored product, withdrawing the air utilized for the heating and again circulating the same after further heating into contact with the wood during the treatment, cooling the treated wood by circulation of cooling air into contact therewith and thereby preheating the air and circulating the preheated air into contact with the wood to preheat the same and simultaneously to increase the moisture content of the air before subjecting it to a temperature of about 380° F. to 420° F.

7. The method of homogeneously transforming wood which comprises subjecting the wood to a temperature of 380° F. to 420° F. by circulating in contact with the wood a heated gaseous current, withdrawing the gas and re-circulating the same after further heating until the wood has been converted into a uniformly transformed product.

8. The method of homogeneously transforming and coloring wood, which comprises movably supporting the wood and subjecting the wood to a temperature of about 380° F. to 420° F. by circulation of heated air into contact therewith, the wood being moved with respect to its supports so that all surfaces of the wood are homogenously transformed.

9. An apparatus for transforming or coloring wood comprising a preheating chamber, a transforming chamber, a cooling chamber, means for circulating air through the cooling chamber to cool the wood therein and for circulating the resulting preheated air through the preheating chamber to preheat the wood therein, means for heating air to the required temperature and for circulating the heated air through the transforming chamber, and means for supporting the wood in said transforming chamber to permit distribution of the heated air into contact with substantially the entire surface of the wood.

10. An apparatus for transforming or coloring wood comprising a transforming chamber, means for so supporting the wood therein as to permit circulation of heated air into contact with substantially the entire surface of the wood, means for heating air to a temperature of about 380° F. to 420° F. and for circulating the heated air through said transforming chamber to heat the wood therein, means for admixing cool air with the heated air, and thermostatically controlled means for regulating said admixture.

11. An apparatus for transforming or coloring wood comprising a preheating chamber, a transforming chamber, a cooling chamber, means for circulating air through the cooling chamber to cool the wood therein and for circulating the resulting preheated air through the preheating chamber to preheat the wood therein, means for heating air to the required temperature and for circulating the heated air through the transforming chamber, and means for intermittently supporting the wood in said transforming chamber at different places on its surface by the aid of movable supports so as to permit uniform distribution of the heated air into contact with the entire surface of the wood being treated.

In testimony whereof I affix my signature.

HOWARD F. WEISS.